(12) United States Patent
Kato

(10) Patent No.: US 7,105,144 B2
(45) Date of Patent: Sep. 12, 2006

(54) METHOD FOR PRODUCING FERRITE HOLLOW PARTICLES

(75) Inventor: Takayuki Kato, Susono (JP)

(73) Assignee: Yazaki Corporation, Tokyo (JP)

( * ) Notice: Subject to any disclaimer, the term of this patent is extended or adjusted under 35 U.S.C. 154(b) by 257 days.

(21) Appl. No.: 10/885,024

(22) Filed: Jul. 7, 2004

(65) Prior Publication Data
US 2005/0006826 A1 Jan. 13, 2005

(30) Foreign Application Priority Data
Jul. 8, 2003 (JP) .......................... P2003-271815

(51) Int. Cl.
*C01G 1/00* (2006.01)
*C01G 49/00* (2006.01)

(52) U.S. Cl. .................. 423/594.1; 423/632; 423/633; 423/335; 423/625; 427/215

(58) Field of Classification Search ............. 423/594.1, 423/632, 633, 335, 625; 427/215
See application file for complete search history.

(56) References Cited

U.S. PATENT DOCUMENTS

| | | | |
|---|---|---|---|
| 4,218,430 A | * | 8/1980 | Biggerstaff .................... 502/8 |
| 4,247,500 A | | 1/1981 | Dixon et al. |
| 5,750,045 A | * | 5/1998 | Nihira et al. ............. 252/62.56 |
| 6,004,525 A | | 12/1999 | Tani et al. |
| 6,492,016 B1 | * | 12/2002 | Lauf et al. ................... 428/329 |
| 2003/0129387 A1 | * | 7/2003 | Lauf et al. ................... 428/329 |

FOREIGN PATENT DOCUMENTS

| | | |
|---|---|---|
| EP | 0 897 745 A1 | 2/1999 |
| EP | 0 918 045 A1 * | 5/1999 |
| JP | 7-237923 A | 9/1995 |
| JP | 10-182264 A | 7/1998 |

OTHER PUBLICATIONS

Japanese Abstract No. 07237923 dated Sep. 12, 1995.
Caruso F et al.: "Magnetic Nanocomposite Particles and Hollow Spheres Constructed by a Sequential Layering Approach", Chemistry of Materials, American Chemical Society, Washington, US, vol. 13, 2001, pp. 109-116, XP002260729.
Gonzalez-Carreno T et al.: "Barium ferrite nanoparticles prepared directly by aerosol pyrolysis", Materials Letters, North Holland Publishing Company. Amsterdam, NL, vol. 43, No. 3, Apr. 2000, pp. 97-101, XP004194287.

* cited by examiner

*Primary Examiner*—Timothy Vanoy
(74) *Attorney, Agent, or Firm*—Sughrue Mion, PLLC

(57) ABSTRACT

A method for producing ferrite hollow particles having a hollow structure formed by mutual sintering of ferrite powder, including: a) a step of mixing a resin powder and a ferrite powder of a particle size smaller than that of the resin powder under compaction thereby forming ferrite powder-coated particles in which ferrite powder coats, in a partially embedded state, surface of the resin powder; and b) a step of heat treating the obtained ferrite powder-coated particles thereby removing the resin powder and mutually sintering the ferrite powder.

8 Claims, 3 Drawing Sheets

METHOD FOR PRODUCING FERRITE HOLLOW PARTICLES

BACKGROUND OF THE INVENTION

1. Field of Invention

The present invention relates to a method for producing ferrite hollow particles having a hollow structure formed by mutual sintering of ferrite powder.

2. Related Art

For example in an electromagnetic shielding material, it is being executed to disperse a ferrite powder in a lightweight material such as a plastic material, in order to achieve a lighter weight and an easier molding. Also for achieving a further lighter weight, there is already known an electromagnetic shielding material utilizing ferrite hollow particles.

For obtaining ferrite hollow particles, there has been employed, for example, a method of dispersing a resin powder in a slurry containing a ferrite powder to obtain a resin powder coated with the slurry containing the ferrite powder, heat treating such resin powder thereby removing the resin powder and forming a hollow interior in the particles as shown in Unexamined Japanese Patent Publication Hei. 10-182264, or a method of dispersing a resin powder in a solution containing a metal or a metal compound (for example a metal oxide or a metal hydroxide) for constituting a component of ferrite, such as iron oxide, thereby obtaining a resin powder coated with the solution containing the ferrite constituting component, and heat treating such resin powder thereby removing the resin powder and forming a hollow interior in the particles for example, Unexamined Japanese Patent Publication Hei. 7-237923.

However, in either of these methods, an insufficient dispersion state of the resin powder results in a mutual binding of the resin, whereby the obtained ferrite hollow particles tend to assume non-spherical distorted shapes and non-uniform particle sizes. Also since the resin powder is dispersed in the slurry containing the ferrite powder or the solution containing the ferrite component then taken out and dried, the amount of deposition of the ferrite powder or the ferrite component often becomes uneven or insufficient in many cases to lead to an uneven thickness in the ferrite shell obtained after the heat treatment, frequently providing thin-walled shells. Therefore, the electromagnetic shielding material prepared with such ferrite hollow particles may show an inferior strength because of a stress concentration on the particles of such distorted shapes or thin shells.

SUMMARY OF THE INVENTION

The present invention has been made in consideration of the aforementioned situation, and has an object of providing ferrite hollow particles of a high strength, showing a larger shell thickness, a shape closer to a spherical shape and a more uniform particle size in comparison with those in prior technologies.

In order to attain the aforementioned object, the present invention provides a method for producing ferrite hollow particles having a hollow structure formed by mutual sintering of ferrite powder, comprising the steps of mixing a resin powder and a ferrite powder of a particle size smaller than that of the resin powder under an under compaction thereby forming ferrite powder-coated particles in which ferrite powder coats, in a partially embedded state, surface of the resin powder; and heat treating the obtained ferrite powder-coated particles thereby removing the resin powder and mutually sintering the ferrite powder.

It is particularly preferable to add, after mixing, mixing the ferrite powder-coated particles and a ceramic powder of a particle size smaller than that of the resin powder under an under compaction thereby forming ceramic powder-coated particles.

According to the invention, there can be obtained ferrite hollow particles which show a large shell thickness, a shape close to a spherical shape, no voids and a uniform particle size.

DETAILED DESCRIPTION OF THE PREFERRED EMBODIMENTS

In the following, preferred embodiments of the present invention will be explained with reference to accompanying drawings.

Figure 1:
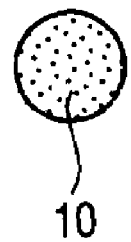
FIGS. 1 (*a*) to (*c*) are views schematically showing a producing process for ferrite hollow particles of the present invention.
Figure 1:
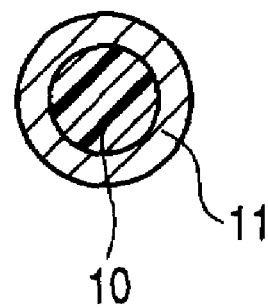
Figure 1:
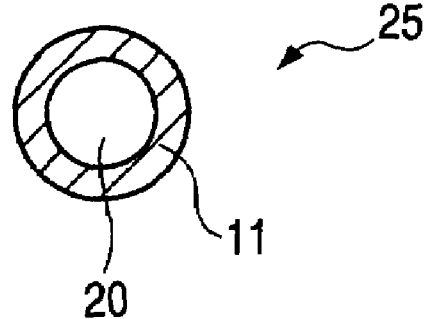
Figure 2:
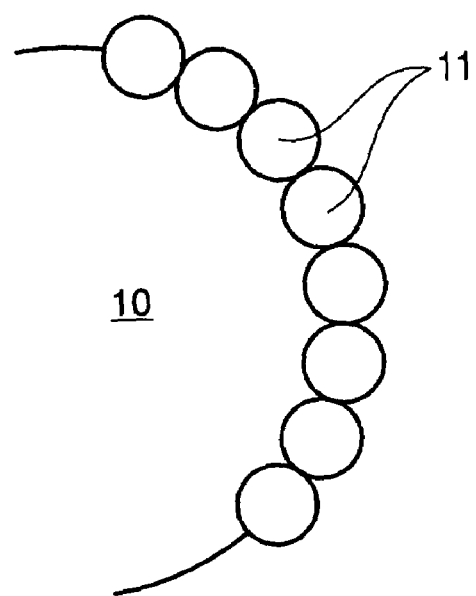
FIG. 2 is a magnified view schematically showing a particle coated with ferrite powder.

In the invention, at first particles are prepared, as shown in FIG. 1 (*b*) and FIG. 2, by coating resin powder 10 with ferrite powder 11 of a particle size smaller than that of the resin powder 10, in a partially embedded state.

Figure 3:
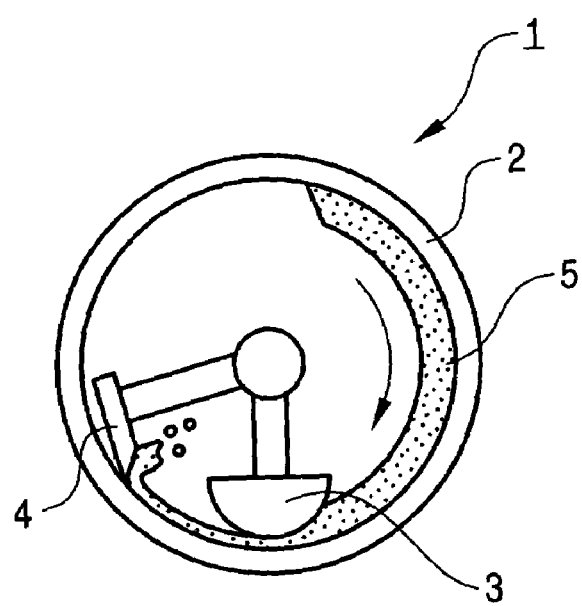
FIG. 3 is a schematic view showing an example of a suitable apparatus for producing the ferrite powder-coated particles shown in FIG. 2.

Such ferrite powder-coated particles are prepared for example with a producing apparatus 1 of a configuration shown in FIG. 3. The illustrated producing apparatus 1 is principally constituted, at a central axis of a rotary drum-shaped chamber 2, of an inner member 3 and a scraper 4 which are provided at a predetermined distance. In order to achieve smooth intake and discharge of a powder mixture 5 of the resin powder 10 and the ferrite powder 11, the inner member 3 has a substantially semicircular cross section at a face opposed to the internal wall of the chamber 2, and forms a small gap to the internal wall of the chamber 2. The producing apparatus 1 of such configuration is available, for example, as a mechano-fusion system (AM-15F, manufactured by Hosokawa Micron Corporation).

At the preparation of the ferrite powder-coated particles, the powder mixture 5 of the resin powder 10 and the ferrite powder 11 is at first charged into the chamber 2 and the chamber 2 is rotated at a high speed in a direction indicated by an arrow. By the centrifugal force of the rotation, the powder mixture 5 is pressed to the internal wall of the chamber 2. Then, when the powder mixture 5 passes through the gap between inner member 3 and the internal wall of the chamber 2, the resin powder 10 and the ferrite powder 11 are mutually pressed by a shearing force, whereby a part of the ferrite powder 11 is embedded in the surface of the resin powder 10. After passing the inner member 3, the powder mixture 5 is scraped off by the scraper 4 and is repeatedly subjected to a similar process. Finally, a part of the ferrite powder 11 is embedded so as to cover the entire surface of the resin powder 10 as shown in FIG. 2. An embedding amount of the ferrite powder 11 into the resin powder 10 at this time is preferably 50 to 80% of the powder volume in order to achieve a securer prevention of peeling off at the heat treatment, and a treating time and the gap between the internal wall of the chamber 2 and the inner member 3 are suitably regulated for this purpose.

Also as the ferrite powder 11, there may be employed powders of different particle sizes. For example ferrite powders of two types having larger and smaller particle sizes allow to obtain the ferrite powder-coated particles of a state, in which gaps formed between the ferrite powder of the larger particle size are filled by the ferrite powder of the smaller particle size, thereby providing denser and firmer ferrite hollow particles.

At the aforementioned pressurized mixing, the chamber 2 may be heated. The heating softens the resin powder 10, thus facilitating the embedding of the ferrite powder 11. However, since certain heat generation can be expected by the pressing action of the inner member 3, the operation can be executed at the normal temperature unless for example a reduction in time is particularly required.

Then, thus obtained ferrite powder-coated particles are charged in a furnace, to achieve gasified ablation of the resin powder 10 and sintering of the ferrite powder 11. Through the sintering of the ferrite powder 11, a shell is generated, as shown in FIG. 1 (c), by the sintered ferrite powder 11 so as to surround a hollow pore 20 formed by the ablation of the resin powder 10, thereby forming a ferrite hollow particle 25.

The ferrite hollow particles 25 thus obtained have a shape close to a sphere and a uniform particle size. Also, as the ferrite powder 11 is subjected to the heat treatment in a state partially embedded in the resin powder 10 and does not peel off until the sintering, the ferrite hollow particles 25 are thick and free from voids.

Conditions of temperature and time for the heat treatment have to be suitably selected, according to the type of the resin powder 10 and the ferrite powder 11, in order that the resin powder 10 is completely gasified and the ferrite powder 11 is sufficiently sintered. The heating may be executed by gradually elevating temperature from the room temperature, but it is preferable to charge the ferrite powder-coated particles into an furnace heated in advance to a temperature at which the resin powder 10 is gasified. In this manner the resin powder 10 is ablated instantaneously whereby the ferrite hollow particles 25 become closer to the spherical shape.

The resin powder 10 is not restricted in the type, but is preferably inexpensive one that instantaneously decomposes at a lower temperature, and powder constituted for example of polystyrene, polymethyl methacrylate, polyethylene or polypropylene can be employed advantageously. Among these, polymethyl methacrylate is preferred as it completely gasifies and ablates at a lowest temperature (about 350° C.). A particle size of the resin powder 10 is also not limited and is suitably selected according to the particle size of the desired ferrite hollow particles 25.

In the invention, in order to further improve the strength of the ferrite hollow particles 25, it is preferable to coat the ferrite hollow particles 25 with a layer constituted of a ceramic powder.

Figure 4:
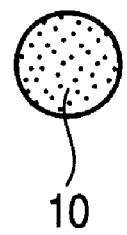
FIGS. 4 (*a*) to (*d*) are views schematically showing a producing process for another embodiment of ferrite hollow particles (ferrite-incorporating ceramic hollow particles) of the present invention.
Figure 4:
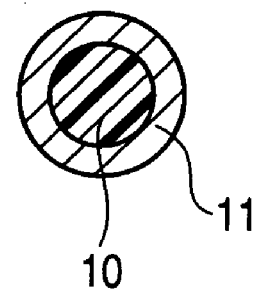
Figure 4:
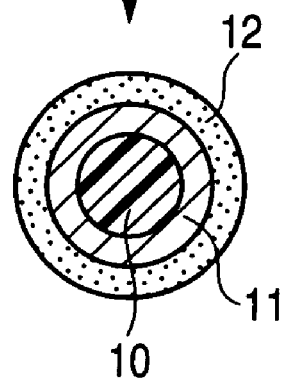
Figure 4:
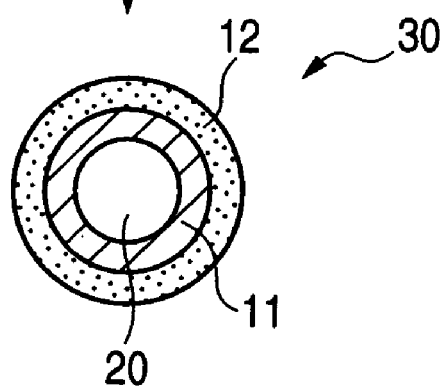

More specifically, as in a process illustrated in FIGS. 4 (a) to (d), a resin powder 10 and a ferrite powder 11 are at first mixed under an under compaction as described above to obtain ferrite powder-coated particles as shown in FIG. 4 (b). Then the ferrite powder-coated particles and a ceramic powder are similarly mixed under an under compaction to obtain ceramic powder-coated particles in which the ferrite powder-coated particles are further coated with the ceramic powder 12 as illustrated in FIG. 4(c) Subsequently, the ceramic powder-coated particles are heat treated to ablate the resin powder 10 and to achieve mutual sintering of the ferrite powder 11 and mutual sintering of the ceramic powder 12 at the same time, thereby obtaining ferrite hollow particles (ferrite-incorporating ceramic hollow particles) 30 of a two-layered structure with an inner layer constituted of the ferrite powder 11 and an outer layer constituted of the ceramic powder 12 as shown in FIG. 4 (d). Therefore, the conditions of the heat treatment have to be such as to cause sintering of the ferrite powder 11 and sintering of the ceramic powder 12.

The ceramic powder 12 is preferably of an oxide or a nitride because of possibility of sintering in the air, and particularly preferably alumina powder or silica powder because of their inexpensiveness, easy availability, wide applicability and relatively high sintering property, but these examples are not restrictive. Also as the ceramic powder 12, there may be employed powders of different particle sizes. For example ceramic powders of two types having larger and smaller particle sizes allow to obtain the ceramic powder-coated particles of a state, in which gaps formed between the ceramic powder of the larger particle size are filled by the ceramic powder of the smaller particle size, thereby providing denser and firmer layer of the ceramic powder. It is also possible to combine ceramic powders 12 of different materials.

Also a ratio of the shell thicknesses of the inner layer constituted by the ferrite powder 11 and the outer layer constituted by the ceramic powder 12 is not restricted and may be suitably selected according to the purpose.

EXAMPLE 1

In the following, the present invention will be clarified further by an example and a comparative example, but the present invention will not be limited by such examples.

In a mechano-fusion system (AM-15F, manufactured by Hosokawa Micron Co.; cf. FIG. 3), a mixture of 50 wt. % of polymethyl methacrylate powder classified into an average particle size of 20 μm, 47.5 wt. % of ferrite powder classified into an average particle size of 0.2 μm and 2.5 wt. % of ferrite powder classified into an average particle size of 0.01 μm was charged, and the chamber was rotated for 30 minutes at 2500 rpm to obtain ferrite powder-coated particles. A gap between the inner member and the chamber was maintained at 1 mm.

Then the obtained ferrite powder-coated particles were charged in an furnace heated to 700° C., heated with a temperature elevating rate of 5° C./min. to 1400° C. which is the sintering temperature of the ferrite powder, then maintained at this temperature for 3 hours, and cooled to the room temperature with a temperature lowering rate of 10° C./min.

In an observation under a scanning electron microscope, each of the obtained particles was a hollow particle formed with a thick shell, showing a shape close to a sphere, no voids and a uniform particle size.

EXAMPLE 2

In a mechano-fusion system (AM-15F, manufactured by Hosokawa Micron Co.; cf. FIG. 3), a mixture of 50 wt. % of polymethyl methacrylate powder classified into an average particle size of 20 µm, 47.5 wt. % of ferrite powder classified into an average particle size of 0.2 µm and 2.5 wt. % of ferrite powder classified into an average particle size of 0.01 µm was charged, and the chamber was rotated for 30 minutes at 2500 rpm to obtain ferrite powder-coated particles under the under compaction. A gap between the inner member and the chamber was maintained at 1 mm.

Then the obtained ferrite powder-coated particles and alumina powder classified into an average particle size of 0.2 µm were subjected to a similar mixing under the under compaction to obtain alumina powder-coated particles.

Then the obtained alumina powder-coated particles were charged in an furnace heated to 700° C., heated with a temperature elevating rate of 5° C./min. to 1600° C. which is the sintering temperature of the alumina powder, then maintained at this temperature for 3 hours, and cooled to the room temperature with a temperature lowering rate of 10° C./min.

In an observation under a scanning electron microscope, each of the obtained particles was a hollow particle formed with a thick shell of two-layered structure, showing a shape close to a sphere, no voids and a uniform particle size.

COMPARATIVE EXAMPLE 1

Polymethyl methacrylate powder classified into an average particle size of 20 µm was dispersed in a slurry containing ferrite powder classified into an average particle size of 0.2 µm. Then the polymethyl methacrylate powder was taken out from the slurry containing the ferrite powder and dried to obtain polymethyl methacrylate powder coated with ferrite powder. Then, such ferrite powder-coated polymethyl methacrylate powder was subjected to a heat treatment as in the example 1.

In an observation of the obtained particles under a scanning electron microscope, there were observed many stringed hollow particles formed by connection of a certain number of particles. Also there were observed hollow particles with a small shell thickness or with a partial void in the shell.

What is claimed is:

1. A method for producing ferrite hollow particles having a hollow structure formed by mutual sintering of ferrite powder, comprising the steps of:

mixing a resin powder and a ferrite powder of a particle size smaller than that of the resin powder under a pressurized contact thereby forming ferrite powder-coated particles in which ferrite powder coats, in a partially embedded state, the surface of the resin powder; and applying a heat treating to the obtained ferrite powder-coated particles thereby ablating the resin powder and mutually sintering the ferrite powder.

2. A method for producing ferrite hollow particles according to claim 1, wherein the ferrite powder, having powders of at least two types having different particle sizes, mix with the resin powder under a pressurized contact.

3. A method for producing ferrite hollow particles as claimed in claim 1, wherein the ferrite powder-coated particles are charged in a furnace heated at a temperature at which the resin powder is gasified, and the ferrite powder-coated particles are maintained at a sintering temperature for the ferrite powder after ablation of the resin powder.

4. A method for producing ferrite hollow particles according to claim 1, wherein the resin powder is made from acrylic resin.

5. A method for producing ferrite hollow particles according to claim 1, further comprising:

mixing the ferrite powder-coated particles and a ceramic powder of a particle size smaller than that of the resin powder under a pressurized contact thereby forming ceramic powder-coated particles.

6. A method for producing ferrite hollow particles according to claim 5, wherein the ceramic powder, having powders of at least two types having different particle sizes, mix with the ferrite powder-coated particles under a pressurized contact.

7. A method for producing ferrite hollow particles according to claim 5, the ceramic powder, having powders of at least two types having different particle in type, mix with the ferrite powder-coated particles under a pressurized contact.

8. A method for producing ferrite hollow particles according to claim 5, wherein the ceramic powder is alumina powder.

* * * * *